United States Patent
Eom (10) Patent No.: US 6,846,349 B2
(45) Date of Patent: Jan. 25, 2005

(54) AIR FILTER AND METHOD OF USING SAME

(75) Inventor: Dae Yong Eom, 566-24, Majang-Dong, Seongdong-Gu, Seoul (KR)

(73) Assignees: Dae Yong Eom, Seoul (KR); Hoi Won You, Gyeong-gi Province (KR)

(*) Notice: Subject to any disclaimer, the term of this patent is extended or adjusted under 35 U.S.C. 154(b) by 0 days.

(21) Appl. No.: 10/317,519

(22) Filed: Dec. 11, 2002

(65) Prior Publication Data
US 2003/0154861 A1 Aug. 21, 2003

(51) Int. Cl.[7] .................. B01D 33/48; B01D 46/04
(52) U.S. Cl. .................. 95/277; 95/279; 55/302; 55/406; 55/428; 55/482
(58) Field of Search .............. 95/277, 279, 280, 95/282; 55/320, 303, 400, 401, 406–409, 428, 482, 302

(56) References Cited

U.S. PATENT DOCUMENTS

| | | | | |
|---|---|---|---|---|
| 1,292,561 A | * | 1/1919 | Baldwin | 55/401 |
| 1,348,966 A | * | 8/1920 | Smith | 55/303 |
| 3,060,663 A | * | 10/1962 | Morris et al. | 55/302 |
| 3,443,696 A | * | 5/1969 | Schutte | 210/297 |
| 3,716,968 A | * | 2/1973 | Mischke | 55/294 |
| 3,778,982 A | * | 12/1973 | Birke | 55/290 |
| 3,936,902 A | * | 2/1976 | Shackleton et al. | 15/304 |
| 3,966,441 A | * | 6/1976 | Freze | 55/290 |
| 4,303,423 A | * | 12/1981 | Camplin et al. | 55/337 |
| 4,377,401 A | * | 3/1983 | Laughlin | 55/290 |
| 4,826,512 A | * | 5/1989 | Fuller | 55/283 |
| 4,948,397 A | * | 8/1990 | Kumar | 95/277 |
| 5,238,473 A | * | 8/1993 | Femiani | 55/290 |
| 2002/0124729 A1 | * | 9/2002 | Dudley | 95/282 |

* cited by examiner

*Primary Examiner*—Robert H. Spitzer
(74) *Attorney, Agent, or Firm*—Hoffman, Wasson & Gitler PC (57) ABSTRACT

An air filter suitable for use on an engine is provided. The air filter includes a hollow filter body into which is positioned a filter installation unit capable of turning within the filter body and constructed to receive a filtering filter. A main air flow opening is formed in one side of the filter body, and a sub air flow opening is formed in another side of the filter body. A dust pick-up part is formed in the filter body having a dust outlet. A ventilator is provided to direct filtered air against an interior surface of a turning filtering filter, and foreign matter accumulated on an exterior surface of the filtering filter is dislodged into the dust pick-up part before being forcibly expelled through the dust outlet.

10 Claims, 7 Drawing Sheets

AIR FILTER AND METHOD OF USING SAME

BACKGROUND OF THE INVENTION

1. Field of the Invention

The present invention relates to an air filter, and more particularly it relates to an air filter suitable for use on a vehicle and having a structure that can not only supply sufficient filtered air for an engine, but also an air filter that can extend a valid life of the air filter without deteriorating filtering function even though a vehicle runs on unpaved dusty roads.

2. Description of the Related Art

A vehicle is generally powered by an engine, and air must be supplied inside of the engine to burn fuel in order to operate this engine. However, only clean air is supposed to be supplied to an engine after screening through an air filter, as outside air contains a great deal of foreign matter including dust.

Figure 1:
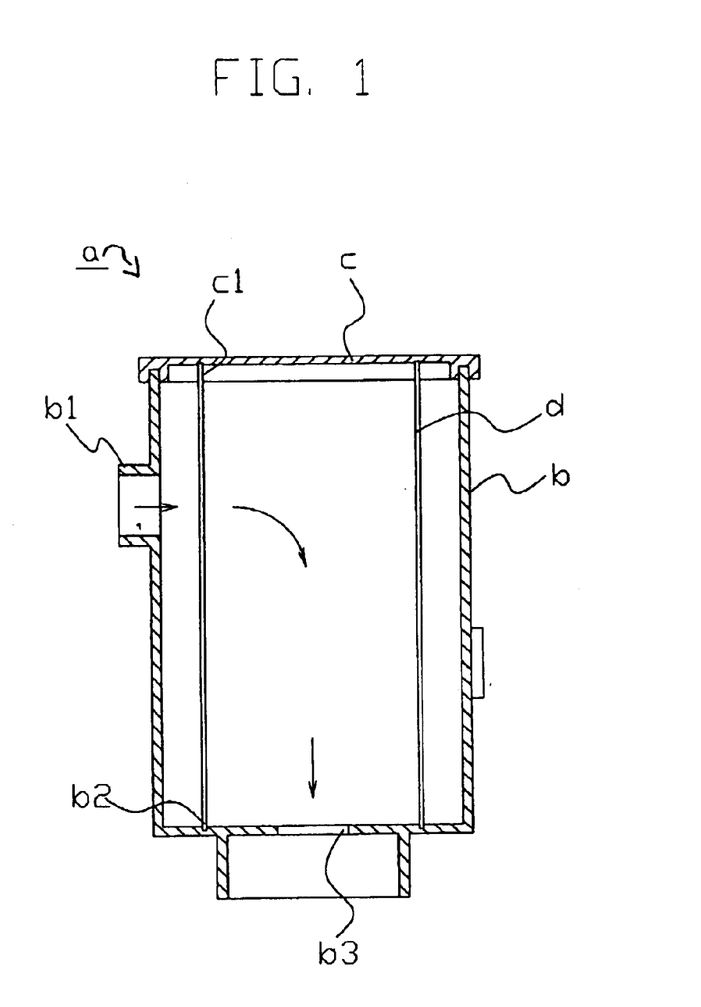
FIG. 1 shows a conventional air filter for a vehicle that includes an air filter assembly, having a basic filter body, a filter cap, and a filter.

FIG. 1 shows a conventional air filter for a vehicle that includes an air filter assembly a, having a basic filter body b, a filter cap c, and a filter d. The basic filter body b is cylindrical in shape having a first end which is open. Typically, basic filter body b has an air flow opening b1 in a designated location, through which external air is flown, a filter assembly groove b2 which forms a groove along the periphery of a lower face of basic filter body b, and an air outlet b3 which is bored through a central part of the lower face and is linked to an intake manifold of an engine thereby supplying filtered air into the intake manifold.

Filter cap c is a circular plate which has a designated diameter and includes a filter assembly groove c1 which forms a groove along the periphery of a lower face of filter cap c. Filter cap c is assembled to the opened first end of basic filter body b so that it can be attached and detached. Filter d has cylindrical or tubular shape in which both ends are open. A first end of filter d is inserted and assembled with filter assembly groove b2 of the basic filter body b, and a second end is inserted and assembled with filter assembly groove c1 of the filter cap c. Filter d, inside of basic filter body b, is supposed to discharge clean air from air outlet b3 after filtering external air flown through air flow opening b1.

In a conventional air filter for a vehicle as described above with reference to FIG. 1, external air flown into a basic filter body through an air inflow opening is supplied to an intake manifold of an engine through an air outlet after flowing into an internal space of a filter, passing through the filter inside of the basic filter body. External air flown into the basic filter body is thereby filtered by a filter while passing through the filter, so foreign matter contained in the air is filtered by the filter to supply clean air only.

Since a filter in the conventional air filter for a vehicle is built-in, or fixed inside of a basic filter body, and filters air without any extra means of removing dust, there are problems with the conventional air filter including the reducing of the useful or valid life of the filter, as well as remarkably deteriorating air filter function as dust is accumulated along an exterior or external part of a filter.

What is needed is an air filter for a vehicle, which not only can provide sufficient filtered air into an engine, but also can extend a useful or valid life of the filter without deteriorating a functionality of the filter even though a car having the engine to which the filter is attached is running on unpaved dusty roads.

SUMMARY OF THE INVENTION

Broadly speaking, the present invention fills these needs by providing an air filter having a ventilator that discharges air against an interior surface of a filtering filter to dislodge accumulated foreign matter during operation of the air filter. The present invention can be implemented in numerous ways, including as a process, an apparatus, a system, a device, or a method. Several embodiments of the present invention are described below.

In one embodiment, an air filter for filtering outside air in order to supply clean air is provided. The air filter includes a filter body that has a hollow interior and a cylindrical shape. The filter body includes an upper part that is open, and a lower part that has a filtered air outlet in a center region. A main air flow opening is constructed in an outer surrounding of the filter body. The main air flow opening is linked to a hollow interior of the filter body, and is formed to be projected outward from the filter body. A sub air flow opening is constructed in the outer surrounding of the filter body. The sub air flow opening is also linked to the hollow interior of the filter body, and is formed to be projected outward from the filter body. A dust pile-up part that has an internal face placed against the sub air flow opening and forms a groove projecting outward along a length of the filter body is further included, and a dust outlet is linked with a hollow interior of a lower part of the dust pile-up part and projects outward from the dust pile-up part. A filter installation unit is positioned within the hollow interior of the filter body. The filter installation unit has a filter assembly groove along a periphery of an upper face of the filter installation unit, and an air outlet that projects downward from the filter installation unit into the filtered air outlet. The filter installation unit is capable of turning within the filter body. A filter cap is capable of attaching to and detaching from the upper part of the filter body, and a driving motor fixed to filter cap. A filter turn unit is configured to connect the driving motor to the filter installation unit to turn the filter installation unit. A filtering filter that is formed in a cylindrical shape with open ends is configured to be inserted into the hollow interior of the filter body and received in the filter assembly groove of the filter installation unit. A ventilator that has an intake opening positioned proximate to the sub air flow opening of the filter body is also provided. The ventilator is positioned within a hollow interior of the filtering filter and has an air discharging opening positioned proximate to the dust pile-up part. External air, which is flown into the filter body as intake air through the sub air flow opening and the intake opening, passes through the filtering filter and discharges from the hollow interior of the filtering filter through the air discharging opening dislodging dust away from an outer surrounding of the filtering filter into the dust pile-up part.

In another embodiment, a method of filtering air is provided. The method of the invention is achieved by letting the air taken in through main air flow opening continue to ventilate through a filtered air outlet after the air is filtered through a filter which is turning at a designated speed. A ventilation means, which is installed and fixed inside the filter that is turning, provides for an intake opening in an intake side, and provides for a sub air flow opening in the filter main body. A filter is provided near the intake opening and air is taken in through sub air flow opening. An air discharging opening is provided in a discharging side of the ventilation means located in an internal direction of the sub air flow opening, and a dust pile-up part is provided on the main body of the filter assembly. Dust that is attached in outer face of filter is forcibly blown to let it drop into dust pile-up part. The dust is discharged toward the outside through nearby dust outlet opening after dust is dropped by a ventilation means and piled up in dust pile-up part.

The advantages of the present invention are numerous. One notable benefit and advantage of the invention is that embodiments of the present invention provide an air filter for a vehicle which filters external air in order to supply clean air to an engine in environments requiring a high degree of filtration, and can accomplish such filtration while maintaining a useful or valid life longer than that of prior art filters.

Another benefit is that embodiments of the present invention provide a way to maintain an optimum state of functionality of a filter by forcibly discharging dust outward, away from the filter, by dislodging dust that is attached to and accumulated on an outer part of the filter. The dust is dislodged using ventilation installed and fixed inside of the filter while turning the filter at a designated speed.

Other advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention for an air filter is disclosed. In preferred embodiments, the air filter includes a turning filtering filter within a filter body, and a ventilator configured to dislodge dust and foreign matter from an exterior surface of the filtering filter during operation. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 2:
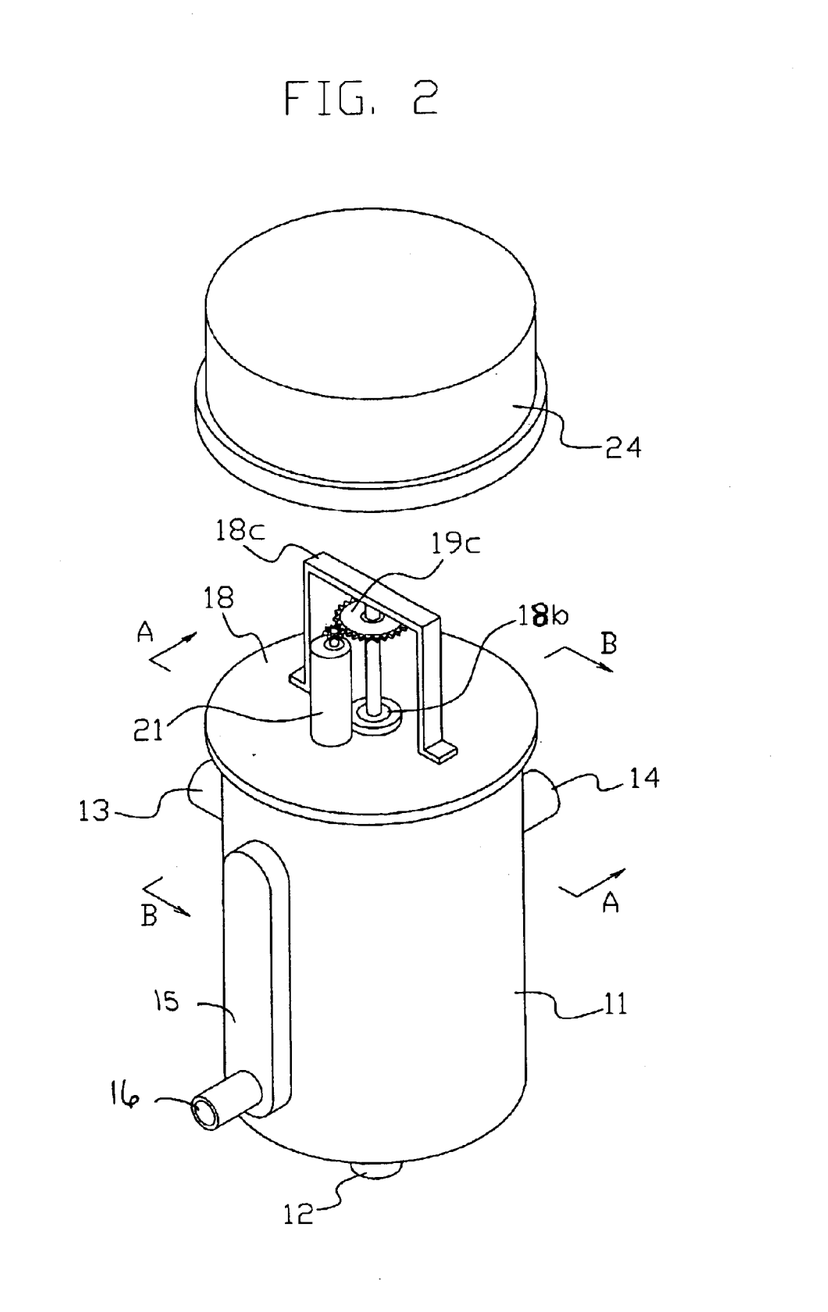
FIG. 2 shows an exterior of an air filter assembly, in accordance with one embodiment of the present invention.

Embodiments of the present invention relate to an air filter for a vehicle, which filters external air in order to supply clean air to an engine. FIG. 2 shows an exterior of an air filter assembly 10, in accordance with one embodiment of the present invention. The air filter assembly 10 has a hollow interior. In the illustrated embodiment, air filter assembly 10 is cylindrical in shape and an upper part is opened. Upper part includes a filter cap 18, a protection case 24, and other components and hardware as will be described below. Lower part includes filter body 11, and other hardware and components as will be described below.

Filtered air outlet 12 connects to an engine (not shown). Filtered air outlet 12 has a projected shape which is formed toward a lower direction from filter body 11 to be connected or linked with a hollow or flange (not shown) having a designated diameter in a central part of an engine.

A main air flow opening 13 is projected and formed toward an exterior or away from filter body 11 linking with a hollow interior of filter body 11 (see FIGS. 3 and 4 below). Main air flow opening 13 has a designated diameter in a designated location of an outer face of filter body 11. A sub air inflow opening 14 is of a projected shape and is formed toward an exterior or away from filter body 11, and is also linked to the hollow interior of filter body 11. Sub air inflow opening 14 has a designated diameter on a designated location of outer face of filter body 11.

A dust pile-up part 15 forms a groove extending outward from an exterior surface of filter body 11. In one embodiment, dust pile-up part 15 has a designated width and length along an internal face of filter body 11, opposite sub air inflow opening 14. A dust outlet 16 projects toward an exterior of dust pile-up part 15, and has a designated diameter linked to a hollow interior in a lower region of dust pile-up part 15.

In one embodiment, a filter cap 18 is provided to seal hollow interior of filter body 11, and to provide access to interior hardware and components. Filter cap 18 is a circular plate having a designated diameter, and is assembled into an upper part of filter body 11. Filter cap 18 can be attached and detached from filter body 11, having an assembly groove which mates with an upper part of filter body 11 along a periphery of a lower face of filter cap 18. An axis assembly hole 18b is bored with a designated diameter through a central part of filter cap 18, and an axis axle support 18c is a hat-shaped support fixed to an upper part of filter cap 18 over axis assembly hole 18b.

Within the interior of filter body 11, filtration and structural features are provided. Such features are not visible in FIG. 2, and are illustrated and described in greater detail below in reference to FIGS. 3–7. As an overview of an embodiment of the present invention as illustrated in FIG. 2, a summary of some of the interior features is provided.

A upper filter assembly groove 19a (see FIG. 3), which is a circular plate possessing a designated diameter, forms a groove along a periphery of a lower face of filter cap 18. A support axis extends vertically upward and penetrates a central part of filter cap 18. The support axis is tubular in shape, has designated diameter and length, and is assembled to be capable of turning within filter body 11 below axis assembly hole 18b. A filter turn unit is also provided which has driving gear configured to be fixed in an upper part of the support axle 18c.

A lower filter assembly groove 17a (see FIG. 3) forms a groove along a soft part of an upper face of a filter installation unit. Lower filler assembly groove is a circular plate having designated diameter. An air outlet is projected and formed toward a lower or downward direction, and is bored through a lower part of the filter installation unit with a designated diameter. Filter body 11 includes filter installation unit built-in in the bottom of hollow interior of filter body 11 with air outlet assembled to be capable of turning within an internal section of the filter air outlet 12 described above.

A filtering filter 20 (see FIG. 3) is cylindrical in shape with open ends, and is inserted and assembled into the filter assembly groove of the filter installation unit with the filter turn unit thus having built-in an inside center hole of the above-mentioned filter body 11.

A driving motor having a gear engaged with the driving gear described above, is installed and fixed in a designated place on top of the filter cap 18 in order to operate filter turn unit. A support is a tube which has a designated diameter and length and it is assembled into the support axle of the filter turn unit, thus its upper part is attached to be fixed into the axle support. A ventilator in which an intake opening is placed in sub air inflow opening 14 side of the filter body 11, is fixed in a lower part of support in order to be placed in the interior of the above-mentioned filter. A discharging opening is placed in the dust pile-up 15 of the filter body 11, and it draws in external air, which is flown through the above-mentioned sub air flow opening 14 into filter body 11, into an intake opening through the filter, and by discharging into inside of filter 17 through the air discharging opening for the purpose of dropping dust, which is around outer surrounding of filter, into the dust pile-up 15. A protection case 24 is provided to protect motor and support axle on top of the filter cap 18.

Figure 3:
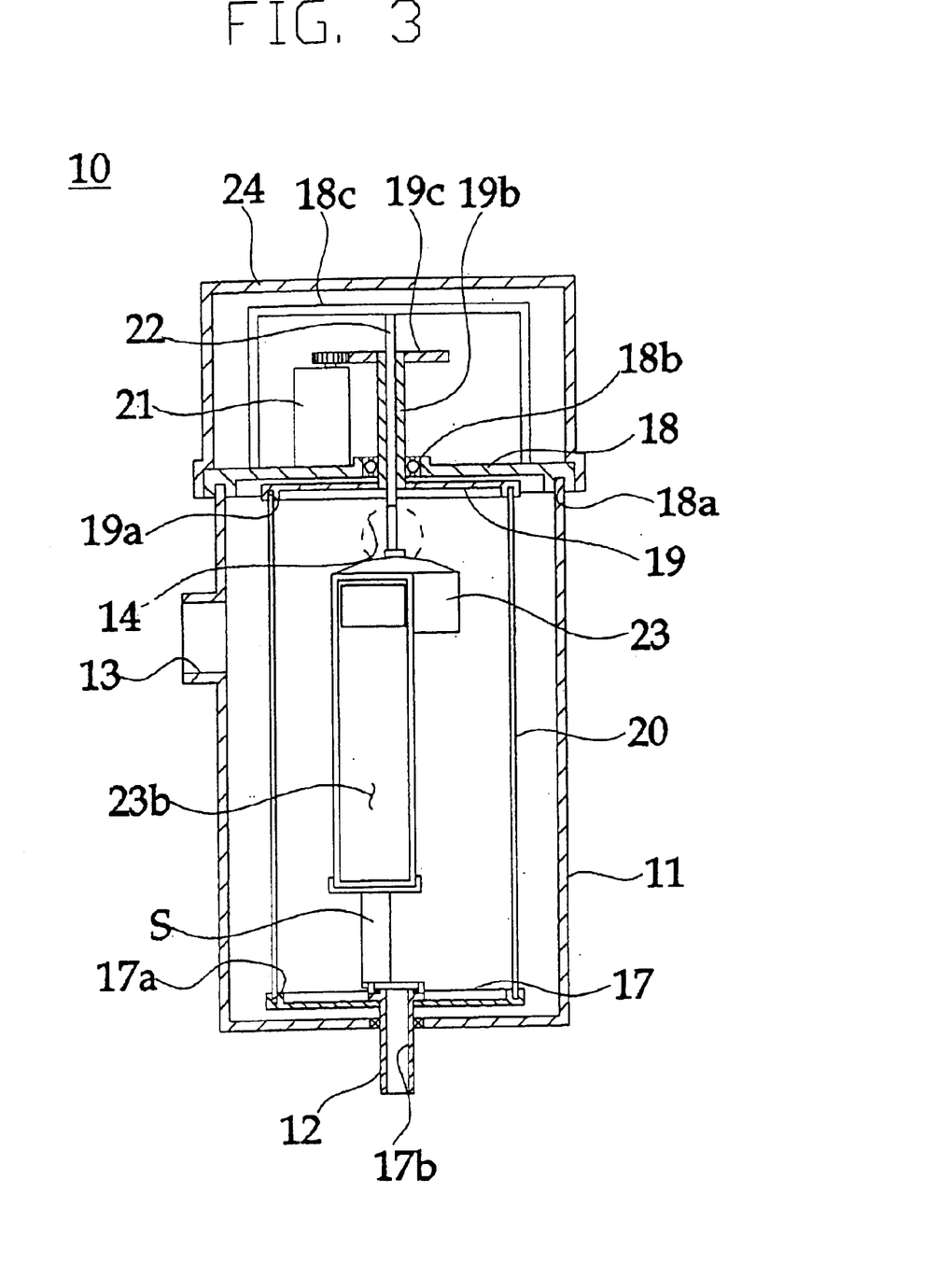
FIG. 3 is a longitudinal sectional view illustrating a sectional view along line A—A of FIG. 2.
Figure 5:
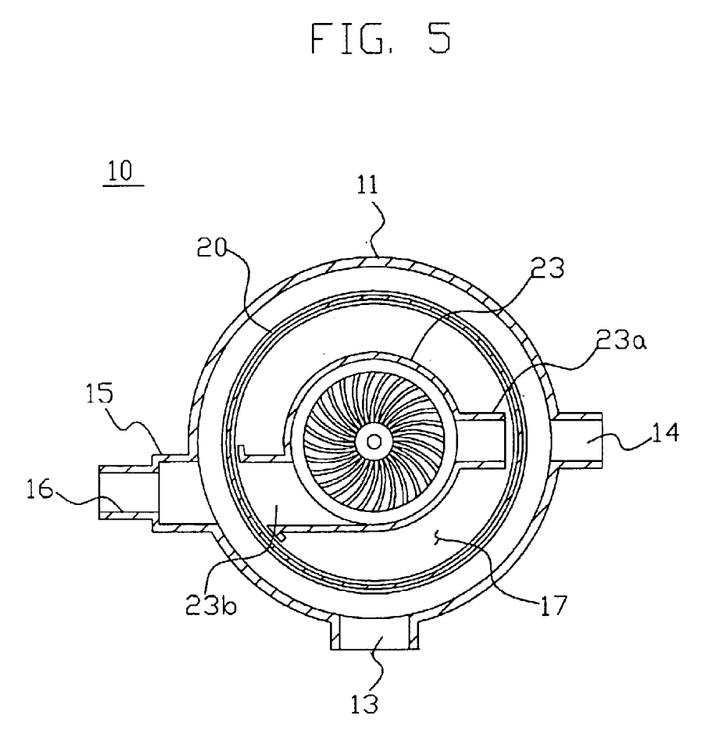
FIG. 5 is a transectional view of an air filter for a vehicle in accordance with an embodiment of the invention.
Figure 6:
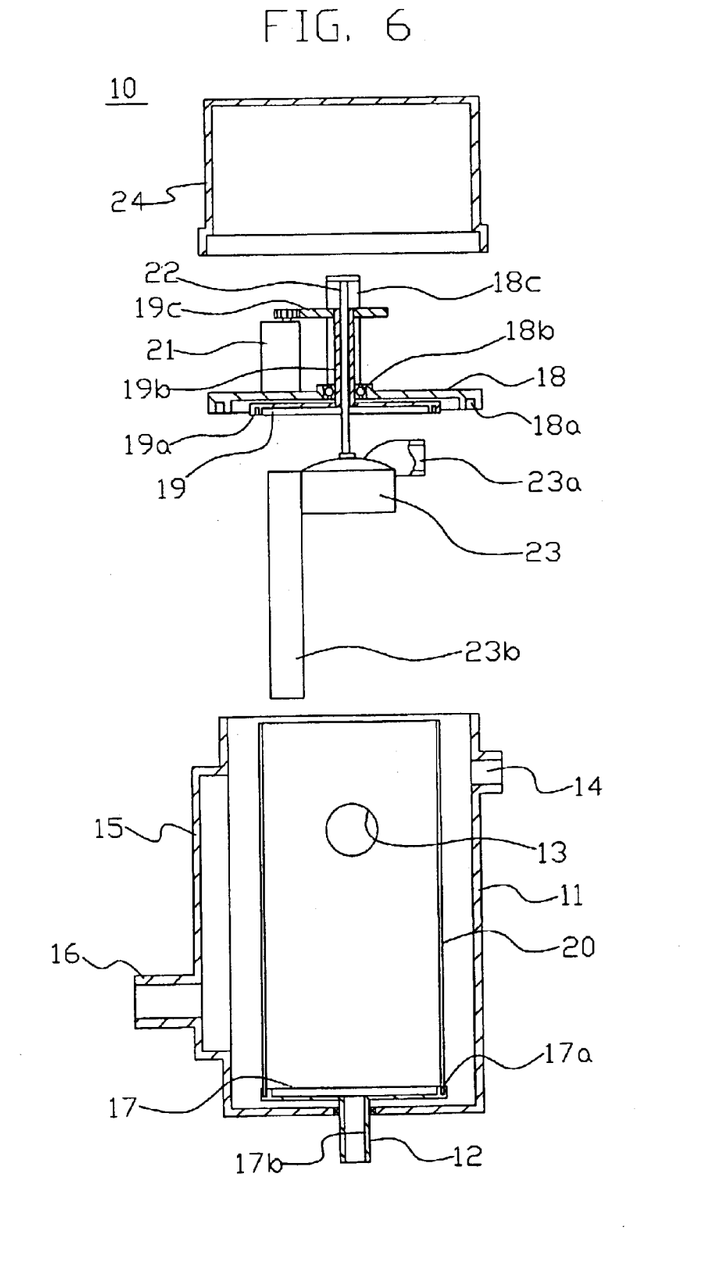
FIG. 6 and FIG. 7 are analyzed sectional views with the filter cap part separated from the filter body of an air filter for a vehicle illustrated in FIG. 3 and FIG. 4, in accordance with an embodiment of the invention.
Figure 7:
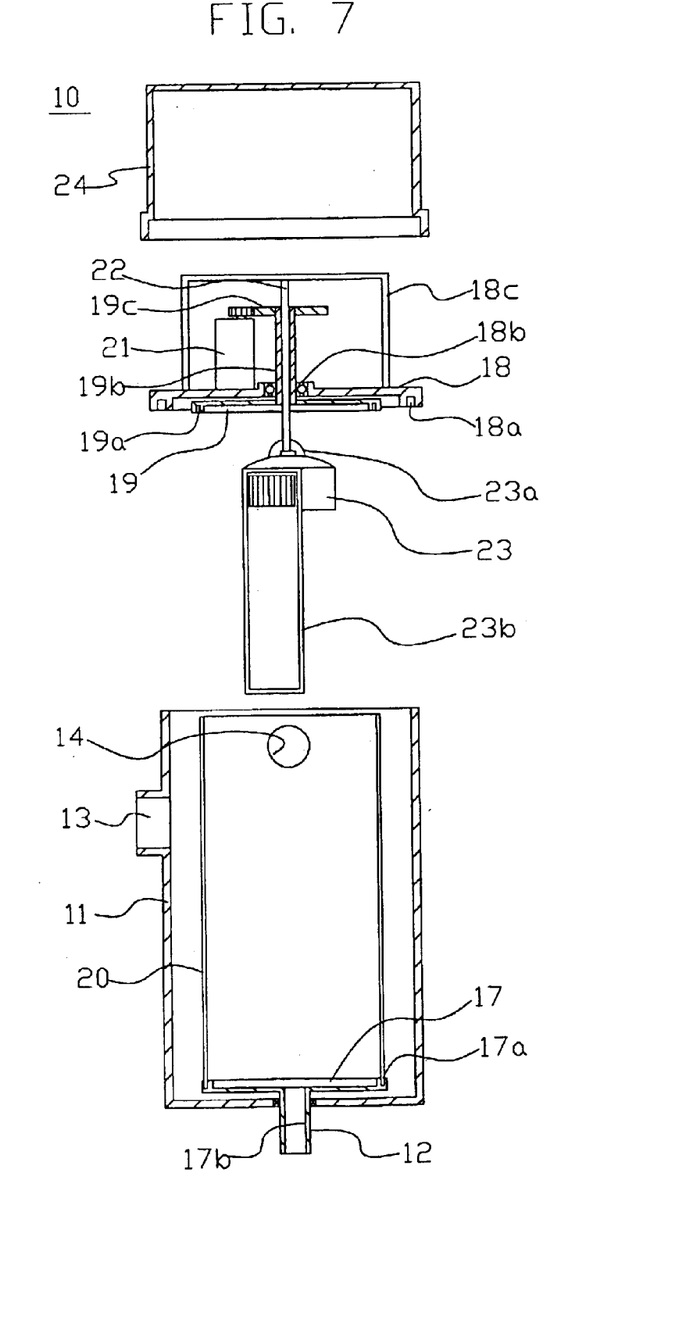

FIG. 3 is a longitudinal sectional view illustrating a sectional view along line A—A of FIG. 2. FIG. 4 is a longitudinal sectional view illustrating as a sectional view along line B—B of FIG. 2. FIG. 5 is a transactional view of an air filter for a vehicle in accordance with an embodiment of the invention. FIG. 6 and FIG. 7 are analyzed sectional views with the filter cap part separated from the filter body of an air filter for a vehicle illustrated in FIG. 3 and FIG. 4, in accordance with an embodiment of the invention.

Figure 4:
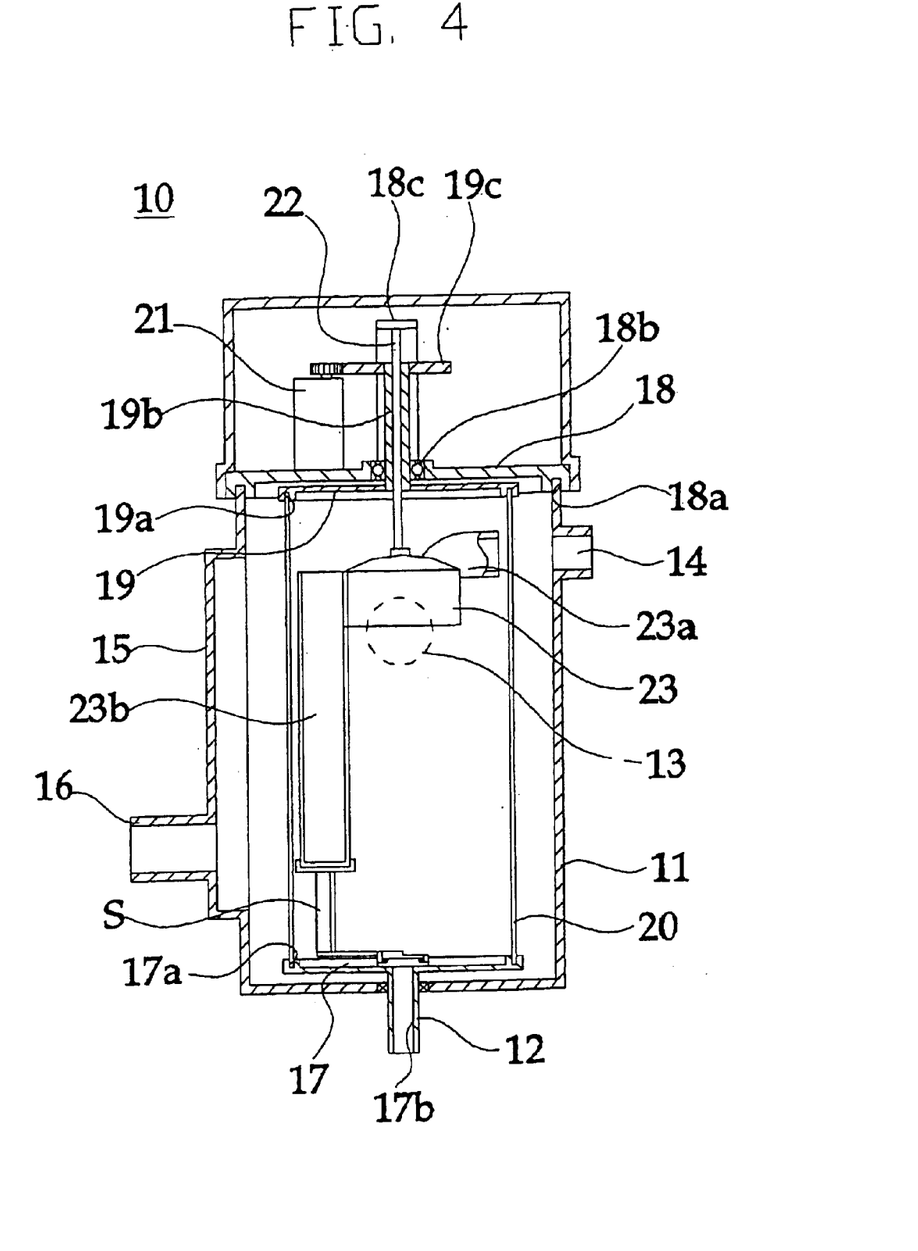
FIG. 4 is a longitudinal sectional view illustrating as a sectional view along line B—B of FIG. 2.

Air discharging openings 23b of FIG. 3 and FIG. 4 are supported by prop S that is combined with an air outlet 17b. Therefore, it is supported more definitely and firmly than when an air discharging opening 23b, which is fixed onto the side of outlet of a ventilation, is not supported by a prop S. As a result, by the ventilating power of air ventilated by an operation of a ventilator 23, vibration of air discharging opening 23b is reduced.

Furthermore, clearance between air discharging opening 23b and filter 20 is very little. Accordingly, air ventilated by a ventilator 23 can directly give a push and shake or otherwise dislodge foreign matter away from filtering filter 20. In one embodiment, after air which is taken in to filter assembly 10 is filtered by filtering filter 20, another ventilator (not shown) for discharging could be installed in dust outlet 16, in order to exhaust toward outside forcibly. By discharging dust more easily through dust outlet 16 by this ventilator for discharging, efficiency rate of filtering of filter assembly 10 can be improved remarkably. In dust outlet 16, dust collection means could be equipped which can collect and throw away dust piled up in dust pile-up part 15.

Embodiments of the invention have been described as a filter for a vehicle in order to explain a filter in this invention, but the filter used for a vehicle can be installed at home and factory to be used for both home and industry.

Further to FIG. 2 through FIG. 7, an air filter assembly 10 for a vehicle according to an embodiment of the invention includes filter body 11, filter cap 18, filter turn unit 19, filtering filter 20, driving motor 21, support 22, ventilator 23 and protection case 24.

The filter body 11 has a central hole inside, and is cylindrical in shape. Filter body 11 is equipped with a filter air outlet 12, a main air flow opening 13, a sub air flow opening 14, a dust pile-up part 15, a dust outlet 16, and filter installation unit 17.

The filter air outlet 12 has a designated diameter in central part of a lower face of filter body 11, forming a projected shape downward to link with central hole, and linked or connected to an engine when it is installed in a vehicle.

The main air flow opening 13 has a designated diameter in a designated location of an outer face of filter body 11, and is linked to an internal central hole. Thus, it is projected outward. The sub air flow opening 14 has a designated diameter in a designated location of the outer face of filter body 11, and is linked to an internal central hole. Thus, sub air flow opening 14 is also projected outward.

The dust pile-up part 15 has a designated width and length, and is positioned in the outer face of filter body 11 opposite sub air flow opening 14. In one embodiment, dust pile-up part 15 forms a groove along the length. Dust outlet 16 has a designated diameter and its shape is projected outward from an internal central hole in a lower section of dust pile-up part 15. Dust piled up in the dust pile-up part 15 is thereby discharged outward.

Filter installation unit 17 is a circular plate which has a designated diameter and it is equipped with filter assembly groove 17a and an air outlet 17b. Filter installation unit 17 is built-in a lower face of filter body 11 in order to turn.

Filter assembly groove 17a is formed as uneven grooves along a periphery of an upper face of filter installation unit 17 so that a lower section of the filtering filter 20 can be inserted and assembled. Air outlet 17b has a designated diameter in a central part of filter installation unit 17. Air outlet 17b penetrates filter installation unit 17, and its shape is projected downward, and inserted and assembled to turn in an internal side of filter air outlet 12 of filter body 11 when attaching a filter installation unit 17.

Filter cap 18 is a circular plate which has a designated diameter, and it is equipped with an assembly groove 18a, an axle assembly hole 18b, and an axle support 18c. In one embodiment, filter cap 18 is assembled into an opening part of filter body 11 in order to attach and detach.

Assembly groove 18a forms a groove to be assembled into an upper part of filter body 11 along a periphery of a lower face of filter cap 18. Axle assembly hole 18b penetrates filter cap 18, and has a designated diameter in a central part of filter cap 18. Axle support 18c is a support formed into a shape of hat with two ends. Both ends are attached and fixed in an upper section of filter cap 18 above and over axle assembly hole 18b.

Filter turn unit 19 is a circular plate which has a designated diameter. Filter turn unit 19 is equipped with filter assembly groove 19a, support axle 19b and driving gear 19c. Filter turn unit 19 is attached to a lower face of filter cap 18.

Filter assembly groove 19a forms a groove along a periphery of a lower face of filter turn unit 19 so that an upper section of filtering filter 20 can be inserted and assembled. Support axle 19b is tubular with a designated diameter and length. Support axle 19b penetrates into central part of filter turn unit 19, and extends vertically upward to be assembled into axle assembly hole 18b to turn in a lower side. Driving gear 19c is attached and fixed in an upper section of support axle 19b.

Filtering filter 20 has a designated diameter and length, and has a cylindrical shape with open ends. A first end is inserted and assembled into a filter assembly groove 17a of filter installation unit 17. A second end of filtering filter 20 is inserted and assembled into filter assembly groove 19a of filter turn unit 19 so that it can be fixed and built-in in an internal central hole of filter body 11.

Driving motor 21, having a gear that engages with driving gear 19c is attached to a turn axle. Driving motor 21 is fixed and installed in a designated location of an upper face of filter cap 18 to drive filter turn unit 19. In one embodiment, a stepping motor is desirable for use as a driving motor 21. Driving motor 21 slowly turns filter turn unit 19 at a low speed so that filtering filter 20 can turn in the hollow interior of filter body 11.

Support 22 is a tube which has a designated diameter and length. Support 22 is assembled into support axle 19b of filter turn unit 19 so that an upper section of support 22 can be attached and fixed in axle prop 18c.

Ventilator 23 is fixed and installed on a lower part of support 22 within an interior hollow space of filtering filter 20. Air intake opening 23a is situated in sub air flow opening 14 of filter body 11, and air discharging opening 23b is situated in dust pile-up part 15 of filter body 11. In one embodiment, ventilator 23 shakes dust away from outer face of the filtering filter 20 by taking in external air, which is flown into filter body 11 through sub air flow opening 14, with air intake opening 23a passing through filtering filter 20, and by discharging toward an inside, or interior surface, of filtering filter 20 through the above-mentioned air discharging opening 23b.

Protection case 24 is cylindrical shape with one open end. Protection case 24 is assembled to cover an upper part of filter cap 18 in order to protect machine parts linked with driving motor 21, and to protect driving motor 21 which is installed in an upper part of filter cap 18.

Being connected electrically, driving motor 21 and ventilator 23 are powered by a battery in a vehicle to which filter assembly 10 is configured.

In one embodiment of the invention, an air filter assembly 10 having the composition as described above is attached to a vehicle and external air is flown into the air filter assembly 10 from a main air flow opening 13 of filter body 11 into the hollow interior of filter body 11. External air flows into an external space around filtering filter 20, then passes through filtering filter 20 and circulates into an internal space of filtering filter 20. The air circulating in the internal space of filtering filter 20 is clean air (filtered air) having foreign matter including dust removed by filtering filter 20. This filtered air is discharged toward an outside of filter body 11 through filter air outlet 12 and air outlet 17b of filter installation unit 17 installed in the lower face of filter body 11 in order to turn. The discharged filtered air is then supplied to an engine through a connection line, port, manifold, and the like.

In the process of air filtering as described above, driving motor 21 and ventilator 23 are constantly operated. Driving gear 19c in filtering filter 20 is turned, which is engaged with the gear part of driving motor 21. By the driving force of driving motor 21, filtering filter 20 is turned, as support axle 19b and filter installation unit 17 linked with this are turning. Filtering filter 20 assembled, fixed, and installed between filter turn unit 19 and filter installation unit 17 turns very slowly. Ventilator 23 intakes air, which is flown into sub air flow opening 14 through intake opening 23a. Air intake is filtered air with foreign matter removed by filtering filter 20 since there is a filtering filter between sub air flow opening 14 and intake opening 23a. This filtered air turns slowly into the above-mentioned dust pile-up part 15 through the above-mentioned air discharging opening 23b and it is discharged into the internal surrounding of filtering filter 20.

As filtered air is discharged into internal surrounding of filtering filter 20 through the above-mentioned air discharging opening 23b, foreign matter including dust attached to outer surrounding of a filtering filter 20 by air filtering action is shaken away, or otherwise dislodged from outer surrounding of filtering filter 20 by discharging power of ventilator 23. Dust is piled up inside of dust pile-up part. The foreign matter piled up inside of dust pile-up 15 is discharged outward through dust outlet 16 formed in lower part of dust pile-up part 15.

While the filtering process of air is constantly obtained by the above-mentioned series of consecutive operations, embodiments of the present invention can not only prevent deterioration of filtering function of filtering filter, but can also extend valid or useful life of the filtering filter remarkably by continuously forcibly removing foreign matter which attaches along the outer surrounding of filtering filter and degrades filtering function. As required air for the operation of the above-described ventilator is supplied through the sub air flow opening, it does not effect air quantity or air flow into a main air flow opening and supplied to an engine, and it can remove foreign matter attached to the filtering filter.

In summary, the present invention provides an air filter suitable for use on an engine, in the home, and in the workplace capable of maintaining adequate filtration in the most demanding of conditions. According to the invention described as above, the disclosed air filter can not only supply sufficient filtered air for an engine, but can also extend a valid life even longer without deteriorating filtering function although a vehicle runs on an unpaved dusty road.

The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims and equivalents thereof.

What is claimed is:

1. A method for filtering air with an air filter, comprising:
   intaking air through a main air flow opening formed in a side of a filter body;
   filtering the air by passing the air through a filtering filter;
   turning the filtering filter;
   intaking additional air through a sub air flow opening;
   flowing the additional air into an interior region of the filtering filter;
   ventilating filtered air into a filtered air outlet;
   discharging the additional air through a ventilator and through the filtering filter;
   dislodging accumulated foreign matter on an exterior surface of the filtering filter;
   collecting dislodged foreign matter in a dust pile-up part; and
   expelling accumulated foreign matter from the dust pile-up part through a dust outlet.

2. The method of claim 1, wherein airflow through the filtered air outlet is not effected by the additional air.

3. An air filter for filtering outside air in order to supply clean air, comprising:
   a filter body having a hollow interior and a cylindrical shape, an upper part of the filter body being open and a lower part of the filter body having a filtered air outlet in a center of lower part of the filter body;

a main air flow opening in an outer surrounding of the filter body, the main air flow opening being linked to a hollow interior of the filter body and formed to be projected outward from the filter body;

a sub air flow opening in the outer surrounding of the filter body, the sub air flow opening being linked to the hollow interior of the filter body and formed to be projected outward from the filter body;

a dust pile-up part having an internal face placed against the sub air flow opening and forming a groove projecting outward along a length of the filter body;

a dust outlet linked with a hollow interior of a lower part of the dust pile-up part and projecting outward from the dust pile-up part;

a filter installation unit within the hollow interior of the filter body, the filter installation unit having a filter assembly groove along a periphery of an upper face of the filter installation unit and an air outlet projecting downward from the filter installation unit into the filtered air outlet, the filter installation unit being capable of turning within the filter body;

a filter cap capable of attaching to and detaching from the upper part of the filter body;

a driving motor fixed to filter cap;

a filter turn unit configured to connect the driving motor to the filter installation unit to turn the filter installation unit;

a filtering filter formed in a cylindrical shape with open ends and configured to be inserted into the hollow interior of the filter body and received in the filter assembly groove of the filter installation unit; and a ventilator having an intake opening positioned proximate to the sub air flow opening of the filter body, the ventilator being positioned within a hollow interior of the filtering filter and having an air discharging opening positioned proximate to the dust pile-up part, wherein external air is flown into the filter body as intake air through the sub air flow opening and the intake opening, the intake air passing through the filtering filter and discharging from the hollow interior of the filtering filter through the air discharging opening dislodging dust away from an outer surrounding of the filtering filter into the dust pile-up part.

4. The air filter of claim 1, wherein the driving motor is a stepping motor and the filtering filter turns slowly at a low speed.

5. The air filter of claim 1, wherein the air discharging opening is supported by a prop combined with an air outlet.

6. The air filter of claim 1, wherein a gap between the air discharging opening and the filtering filter is small.

7. The air filter of claim 1, further comprising a discharging ventilator installed in the dust outlet, the discharging ventilator being configured to exhaust air forcibly through the dust outlet.

8. The air filter of claim 1, wherein the dust outlet includes means for collecting dust discharged from the dust pile-up part.

9. The air filter of claim 1, wherein the air filter is installed in a home.

10. The air filter of claim 1, wherein the air filter is installed in a factory.

* * * * *